No. 656,713. Patented Aug. 28, 1900.
F. M. BORING.
VOTING MACHINE.
(Application filed June 19, 1899.)
(No Model.) 10 Sheets—Sheet 1.

WITNESSES
INVENTOR
Frank M. Boring
BY
Alfred M. Allen
ATTORNEY.

Fig. 6.

No. 656,713. Patented Aug. 28, 1900.
F. M. BORING.
VOTING MACHINE.
(Application filed June 19, 1899.)

(No Model.) 10 Sheets—Sheet 4.

WITNESSES. INVENTOR
L. C. Leoty Frank M. Boring
Clarence E. Mehlhope BY Alfred M. Allen
 ATTORNEY.

No. 656,713. Patented Aug. 28, 1900.
F. M. BORING.
VOTING MACHINE.
(Application filed June 19, 1899.)

(No Model.) 10 Sheets—Sheet 5.

WITNESSES
INVENTOR
Frank M. Boring
BY Alfred M. Allen
ATTORNEY

No. 656,713. Patented Aug. 28, 1900.
F. M. BORING.
VOTING MACHINE.
(Application filed June 19, 1899.)

(No Model.) 10 Sheets—Sheet 6.

WITNESSES
L. C. Leoty
Clarence E. Mehlhop

INVENTOR
Frank M. Boring
BY
Alfred M. Allen
ATTORNEY

No. 656,713. Patented Aug. 28, 1900.
F. M. BORING.
VOTING MACHINE.
(Application filed June 19, 1899.)
(No Model.) 10 Sheets—Sheet 8.

WITNESSES
L. C. Leoty
Clarence E. Mehlhope

INVENTOR
Frank M. Boring
BY
Alfred M. Allen
ATTORNEY.

UNITED STATES PATENT OFFICE.

FRANK M. BORING, OF DAYTON, OHIO, ASSIGNOR OF ONE-HALF TO LEOPOLD RAUH, OF SAME PLACE.

VOTING-MACHINE.

SPECIFICATION forming part of Letters Patent No. 656,713, dated August 28, 1900.

Application filed June 19, 1899. Serial No. 721,037. (No model.)

*To all whom it may concern:*

Be it known that I, FRANK M. BORING, a citizen of the United States, residing at Dayton, in the county of Montgomery and State of Ohio, have invented certain new and useful Improvements in Voting-Machines, of which the following is a full, clear, and exact description, reference being had to the accompanying drawings, forming part of this specification.

My invention relates to mechanism for registering and recording mechanically the selection by voters of various candidates to be elected at any election, and my machine has special relation to use under the Australian ballot system, in which a ticket containing the names of all the candidates is presented, the voter registering his choice by indicating in some way his particular selection.

The purpose of my invention is to provide a machine by which the selection of each voter may be properly registered and at the same time recorded, so that the record may serve as a check on the operations of the register, and, further, to provide a record which can be preserved for use in case of any contest, to be returned by the election officers to the proper board or officer with the report of the votes. Provision is made, as will be hereinafter described, for the voting of straight tickets, for the selection of individual names from any of the tickets, or for voting for candidates who have not been nominated on any regular ticket. I also provide for the use of ballot-balls in the selection of candidates as possibly a more convenient and readily-understood method of voting and one which voters have been accustomed to use from time immemorial, and as a further check on the operation of the machine I make provision, when desired, to retain in a proper receptacle, one for each candidate, every ballot-ball that has been deposited, so that the number of balls in each candidate's receptacle will establish without regard to the registry and recording mechanism the votes he may have secured.

Many other improvements in construction and operation will also appear as the details of my apparatus are made clear in the subsequent description thereof.

It has been my endeavor in constructing and arranging my machine to comply with all the requirements of the laws of the different States relating to the methods of voting and the secrecy of the selection to be made by the voter.

The machine can be readily constructed of any desired size and to suit the requirements of any election, and when not in use at all times open to the inspection of the election judges and other officers; but when so open to inspection the operating mechanism is locked against any interference. When the voter enters the voting-booth, however, he takes the apparatus with him and by this act he unlocks the mechanism to register his choice in entire secrecy, and as he leaves he calls into operation the operating mechanism to register his selection, so that he can correct his ballot up to the time he leaves the booth, and as he leaves it without any act on his part except opening the door to withdraw his vote is registered and recorded.

In the drawings, Fig. 6$^a$ is a top plan view of the machine with the front top plate broken away to show the construction and relation of parts. Fig. 6$^b$ shows details of the interfering-blocks in plan and side elevation.

As already stated, my machine has special reference to the system of voting known as the "Australian" ballot system, in which the names of all of the candidates of all of the parties are presented to the voter for his selection.

Figure 1:
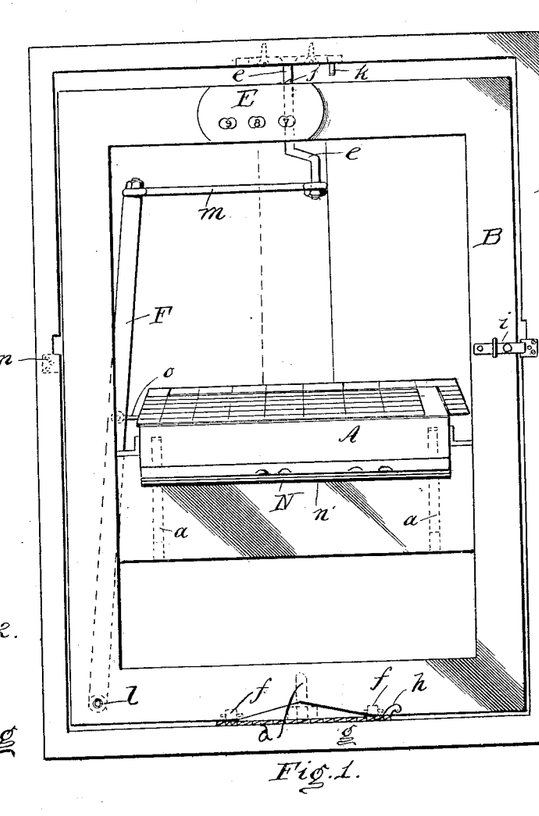
Figure 1 is a front elevation of the voting-booth with my machine in place.
Figures 2, 3, 4, 5:
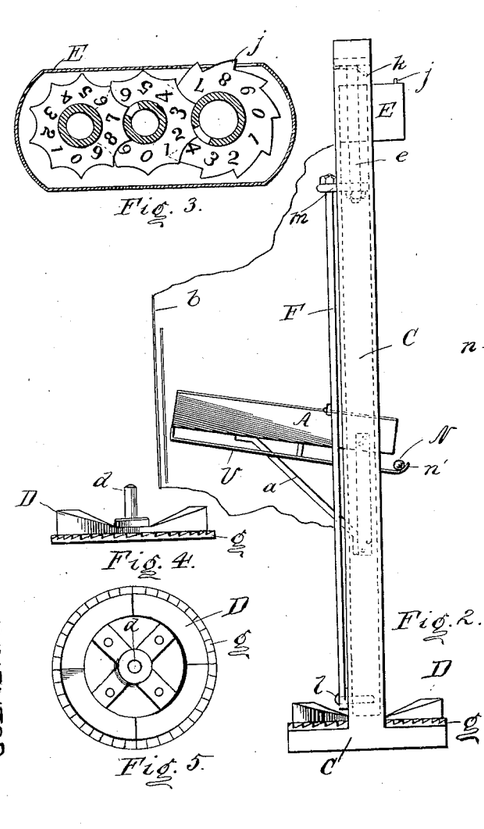
Fig. 2 is a side elevation of same.
Fig. 3 is a detail sectional view of the booth-register.
Fig. 4 is a side elevation of the undulating track upon which the booth-door rides.
Fig. 5 is a top plan view of same.

A is the case holding the voting mechanism, which is secured by brackets $a\ a$ to a panel of the swinging door B in a position to be readily accessible to the voter and preferably on a slight incline. This door is provided with a recessed back formed, preferably, of any thin curtain material $b$, so as to effectually conceal the voting-machine, but to allow the machine to be fixed partially through the open space in the door B, as shown in Fig. 2. This door and the voting mechanism are mounted centrally in a door-frame C, pivoted on the pin $d$ at the center of an undulating track D, secured to the door-sill at the bottom and pivoted at the top on a rod $e$, permanently secured to the head of the door-frame. The undulating track D is provided, as shown in Figs. 4 and 5, with two high and two low places, while rollers $f\ f$ on the door B ride on this track, so that as the door is rotated on the pivots $d$ and $e$ the door itself will be raised at each half-revolution. A ratchet $g$ on the track D and a pawl $h$ on the door compel the movement of the booth-door in one direction only, while $i$ is an ordinary latch to be raised by the voter as he enters the booth. In the position shown in Fig. 1 the door and the voting-machine are presented openly to the public and the necessary election officials, while the voting position is back of the door, and the voter as he enters the booth raises the latch $i$, pushes the door in, and takes in with him the voting-machine, so that while he is engaged in voting the machine and voter are entirely concealed.

In order to register the number of voters who pass into the booth, I provide a register E at the top of the door, arranged with a series of register-wheels, as shown in Fig. 3, the details of which need not be explained. One tooth $j$ of the units-wheel extends out through a suitable slot in the register-case, and as the door is rotated by the voter this tooth is brought in contact with a spring-pawl $k$, fixed to the head of the door-frame, and the register-wheel is moved on one point, thus keeping accurate register of the number of voters who enter the booth.

F is a bar pivoted to the back of the door at the bottom at $l$ and at the top to an arm $m$, connected with the lower end of the rod $e$, which, as has been stated, is permanently fixed to the head of the door-frame. The voter as he enters the booth raises the latch, which when released drops back to its normal position, and he swings the door until the latch comes in contact with the plate $n$ on the other side of the frame, thus making a half-revolution of the door. The result of this movement is that the lower end of the rod $e$ being eccentrically fixed with reference to the door the outer end of the arm $m$ will be nearer to the edge of the door when the voter has pushed the door half-way around, and consequently the bar F will have moved over sufficiently to shift the connecting-shaft $o$ for a purpose to be hereinafter set forth.

Before passing to the description of the voting mechanism itself I wish to call special attention to the fact that the voting-machine and all its mechanism when there is no voter in the booth is presented to the full view of the judges of election and other officers, so that any tampering with the machine will be manifest at once, and also that when the voter enters the booth he takes the machine and all the apparatus with it, and his voting can and must be done in absolute secrecy The case A, located as I have described, is divided into a series of cells by suitable partitions $p$, of a suitable width and length for the names of the various candidates on top plates, to be described, and of such number of cells, one for each candidate, as it may be necessary to vote for at any election. In the drawings I have illustrated my machine with reference to four tickets, which I have denominated "Republican," "Democratic," "Prohibition," and "irregular;" but it will be understood that the machine can of course be constructed for as many different tickets and have as many different names on each ticket as may be needed.

Figure 6:
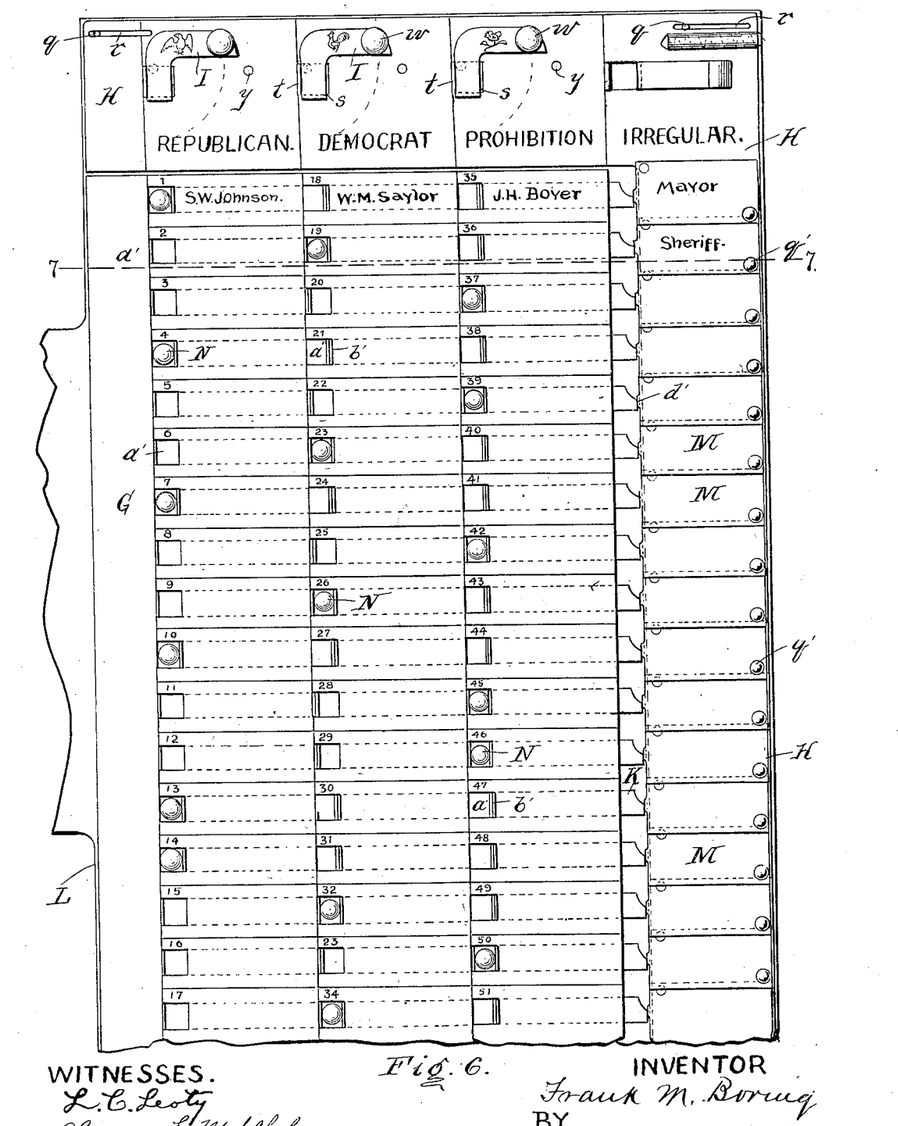
Fig. 6 is a top plan view, broken away at the bottom, of the voting-machine.

G is the top plate of the machine, which is fixed to the case and is divided by lines or indentations or corrugations or in any suitable way into spaces, which I have numbered in Fig. 6 "1" to "51," and on this plate in each space is pasted or written the name of the candidate.

H is a plate, in the shape of a carpenter's square, which extends from the upper left-hand corner along the top and right-hand side of the machine. This plate has limited sliding motion and is secured and guided by pins $q$, which take into slots $r$ at the three corners of the plate. Upon this plate H are printed the denominations of the various tickets, and this plate also carries provision for irregular voting, as will be hereinafter described.

It is the purpose of my machine to render ample and perfect provision for any method of voting under the Australian ballot system—that is, so that straight tickets can be voted, mixed tickets, or an entire new ticket—and in describing the machine I have illustrated different mechanical movements for voting the different forms of tickets, all, however based on the same general principles, and in describing my machine I will take up the different methods separately, although it will be evident that the entire system is based on the same general plan, and I do not wish to be understood as limiting any of the mechanical movements that may be described to the particular kind of vote to which I have applied it. In other words, I wish it to be understood in the outset the plan I will hereinafter describe for voting and registering in the case of multiple voting is equally applicable to voting mixed tickets or straight tickets and that the same is true for the plan pursued in regard to the mixed ticket and straight tickets with reference to the other forms.

The plate H, carrying the names of the various tickets, as above described, is provided with slots $s$, the metal of which is turned up to form lugs $t$.

Figure 6A:
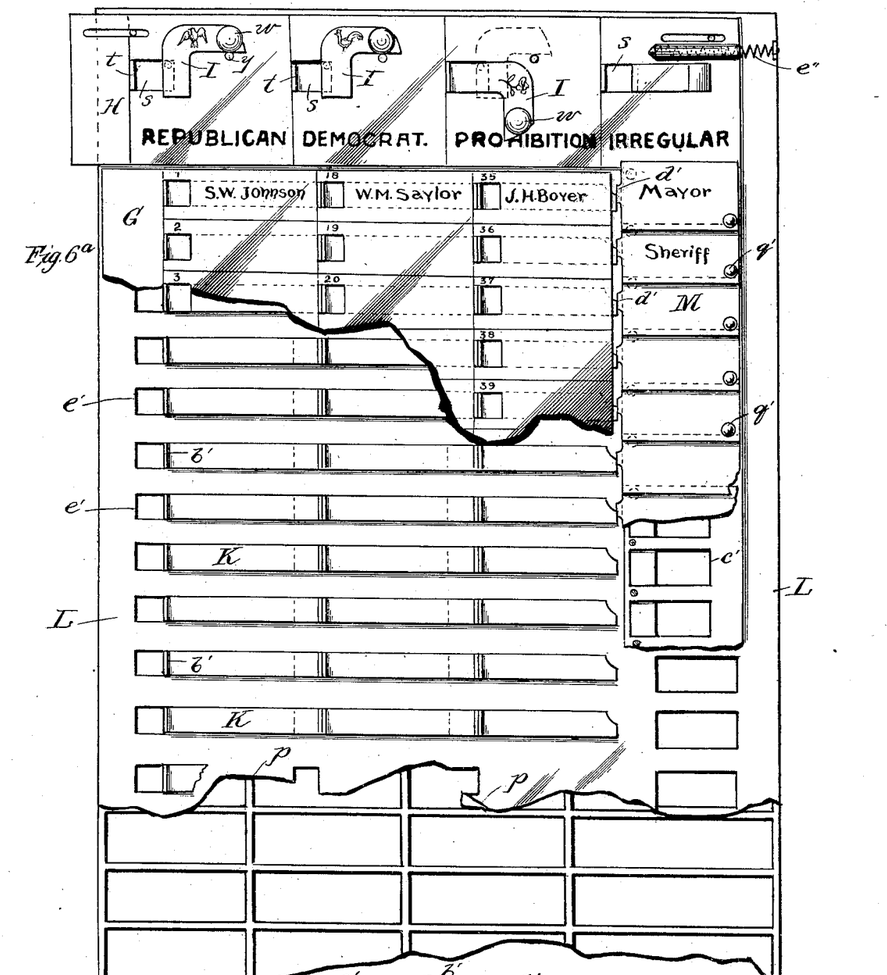
Figure 6B:
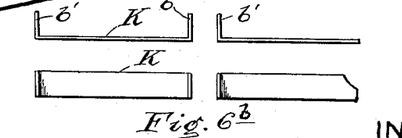

I designates angular levers mounted on top of the plate H, secured to the upper ends of the shanks $u$ of the arms $v$, which shanks pass through the main sliding plate of the machine L. These levers I are provided with handles $w$ $w$, and the ends of the levers abut against the lugs $t$ $t$ on the plate H. If the voter desires to vote a straight ticket, he draws down one of these handles $w$, as in Fig. 6, the Prohibition ticket straight. The pivotal point of the lever being fixed, this movement of the handle in voting the straight ticket slides the plate H to the left, as shown in Fig. 6$^a$, and brings the pins $y$ on the plate H directly underneath the other handles $w$ $w$ of the other levers, so that having pulled down or voted one straight ticket the voter cannot vote any other.

Figure 7:
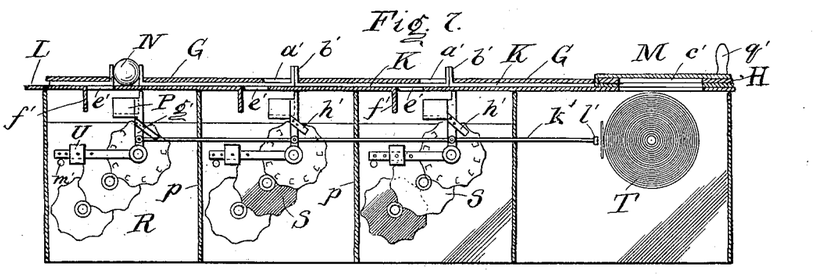
Fig. 7 is a cross-sectional elevation of the machine, taken on lines 7 7 of Fig. 6.
Figure 8:
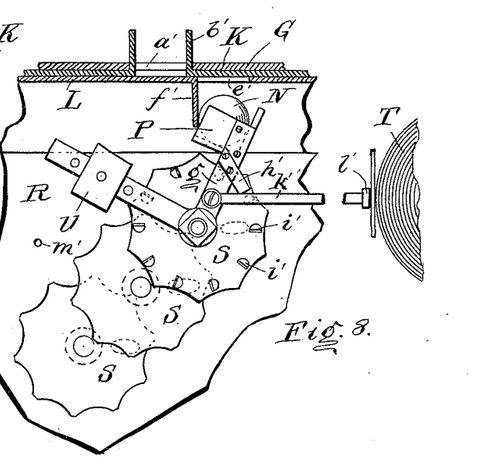
Fig. 8 is a detail sectional elevation of one of the voting-cells after the voter has left the machine.
Figure 9:
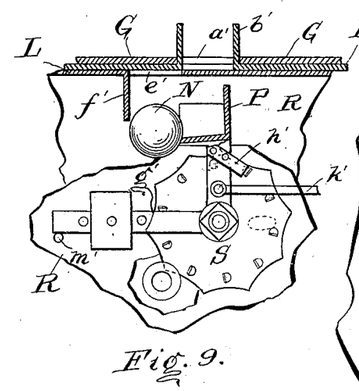
Fig. 9 is a similar view showing the position of the voting mechanism as the next voter enters the booth.
Figure 10:
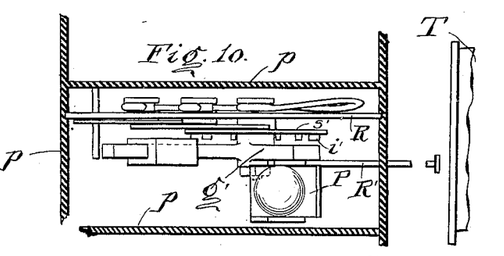
Fig. 10 is a top plan view of the section shown in Fig. 8 with the top cell-plate removed.
Figure 11:
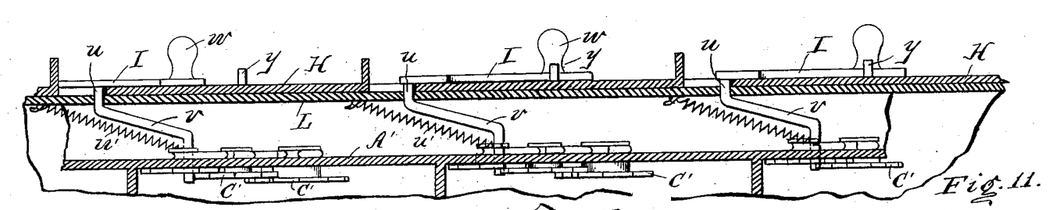
Fig. 11 is a detail cross-sectional view of the voting mechanism at the head of the ticket with the printing-bars omitted.
Figure 12:
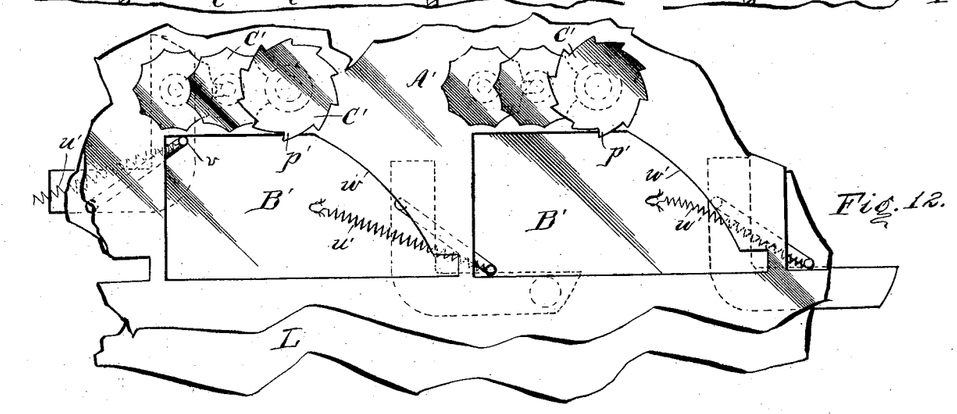
Fig. 12 is a bottom plan view of Fig. 11.
Figure 13:
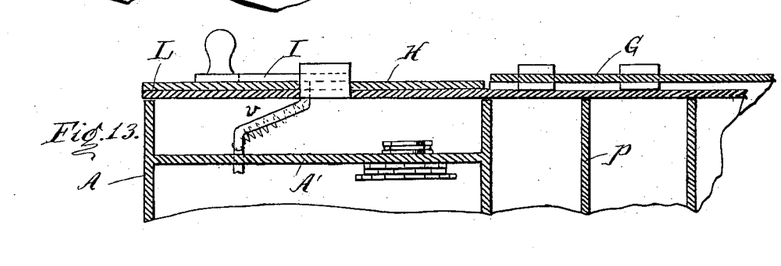
Fig. 13 is a longitudinal detail section of the upper left-hand corner of the machine.
Figure 14:
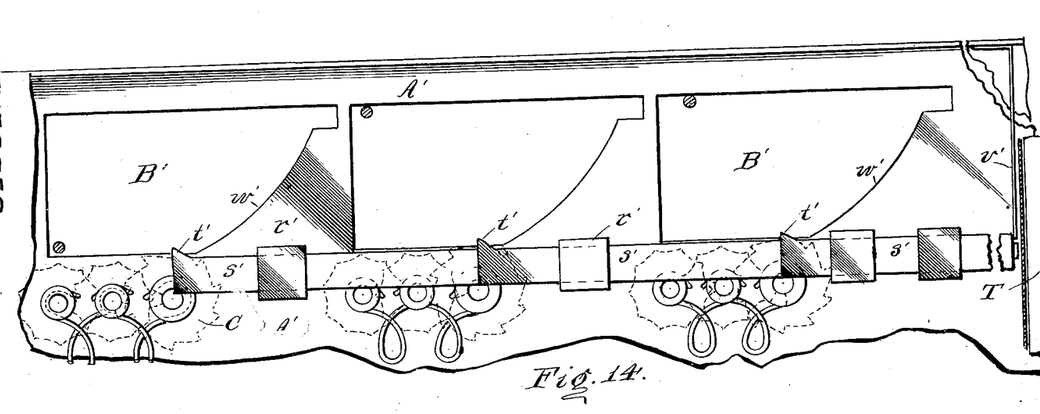
Fig. 14 is a top plan view of the mechanism at the head of the ticket with the upper plate removed.
Figures 15, 16:
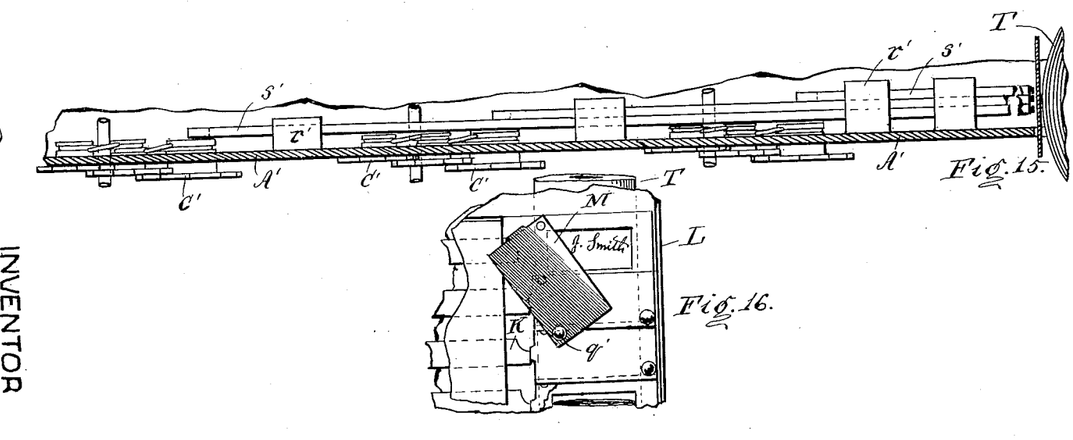
Fig. 15 is a similar sectional view to that shown in Fig. 11 with the top plate removed and the printing-bars in place.
Fig. 16 is a top plan view of a portion of the irregular ticket.
Figure 17:
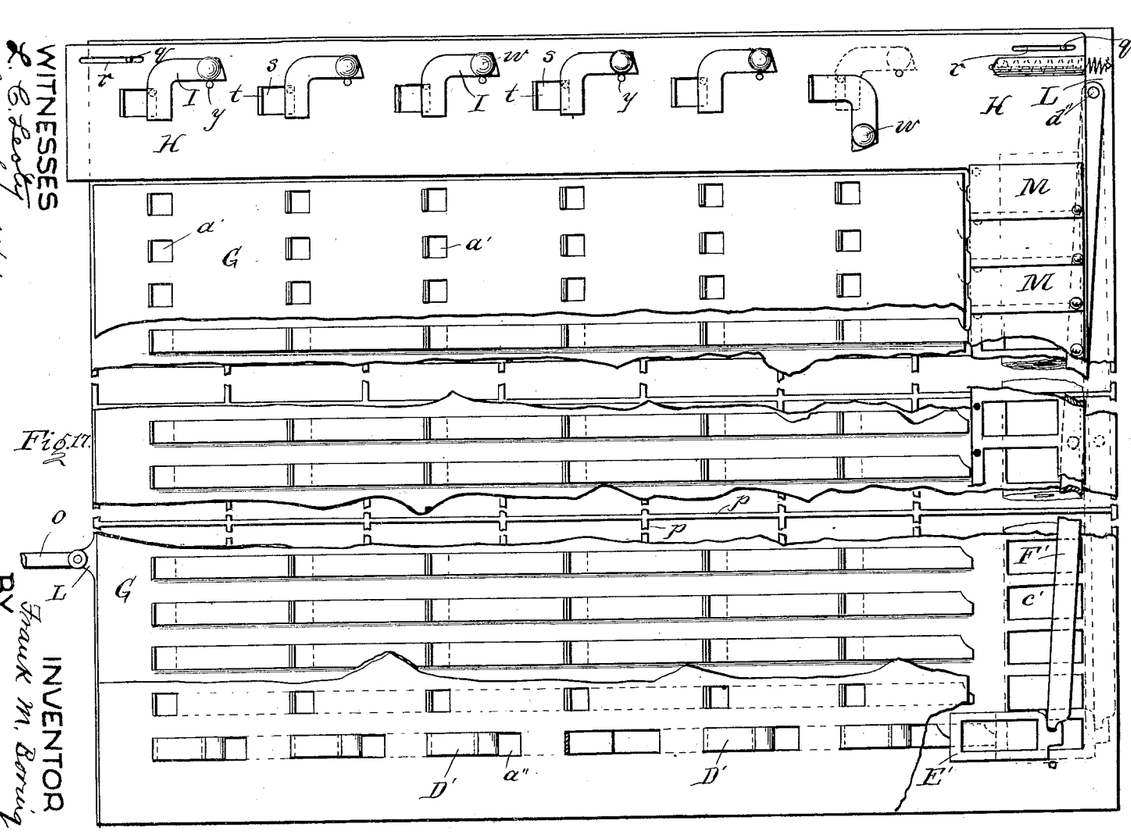
Fig. 17 is a top plan view of my voting-machine broken away to show the upper, lower, and middle sections arranged to vote for two candidates to be elected to the same office or for "multiple" voting.
Figure 18:
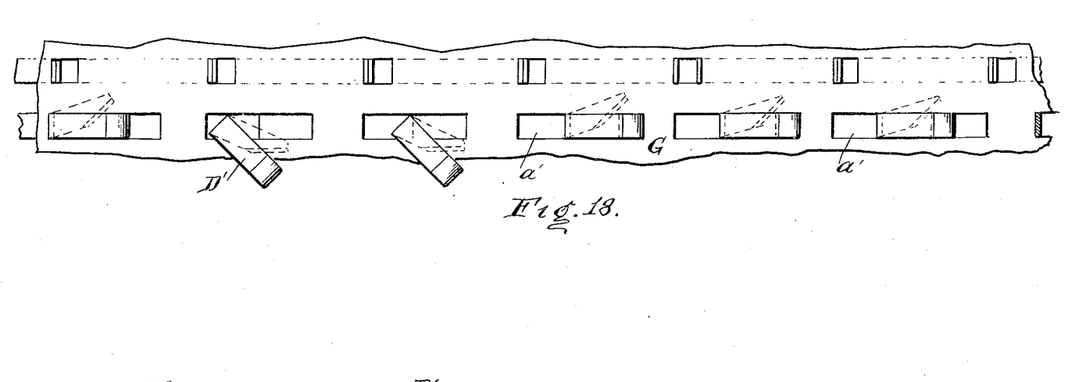
Fig. 18 is a detail plan view of the lower section shown in Fig. 17 arranged for multiple voting, with two voting-handles pulled down.
Figure 19:
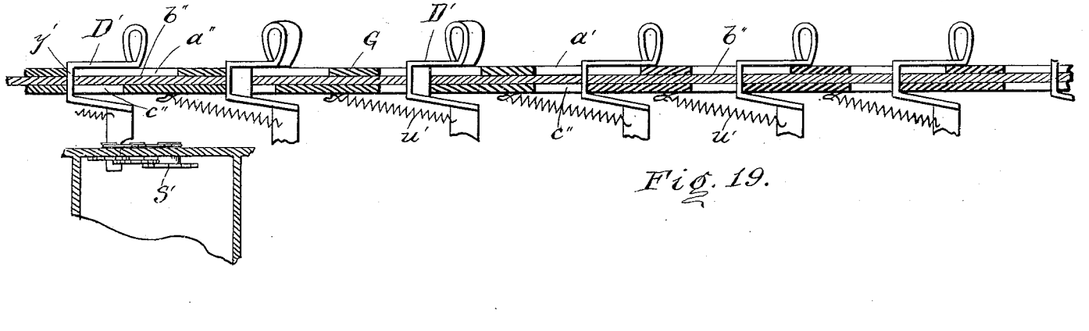
Fig. 19 is a sectional elevation of same.
Figures 20, 21, 22:
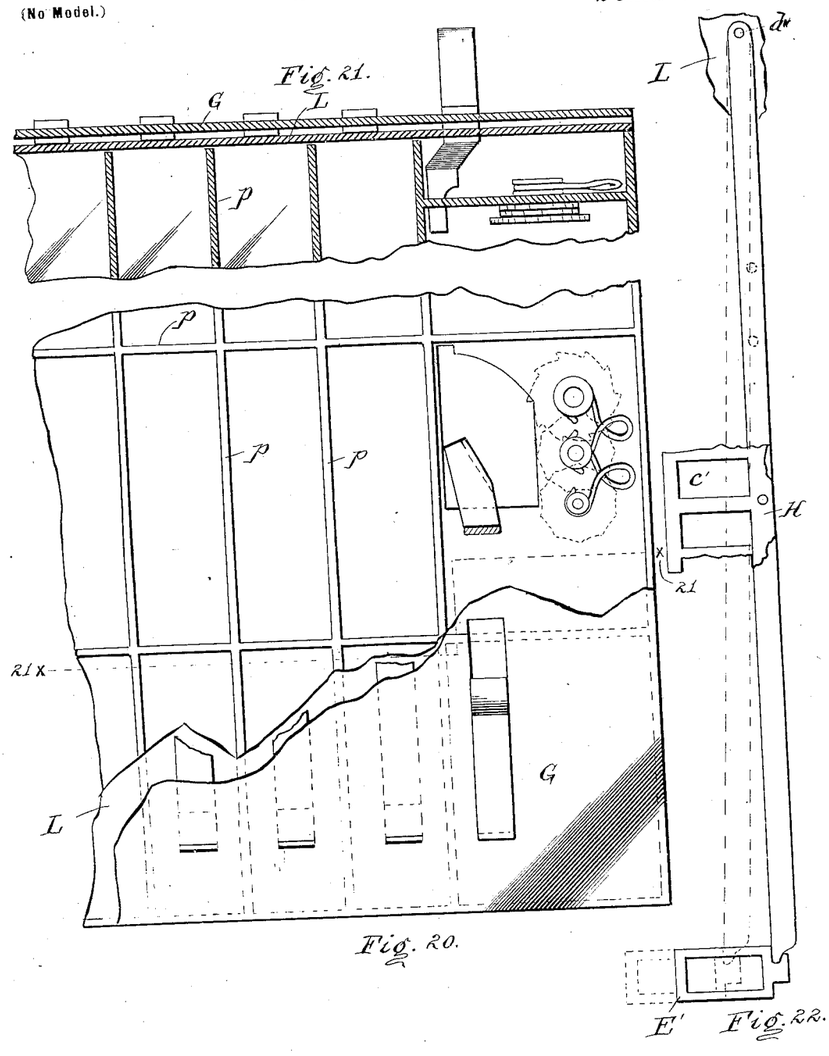
Fig. 20 is a top plan view of the lower left-hand corner of the machine, partly broken away.
Fig. 21 is a section of same, taken on lines 21 21 of Fig. 20.
Fig. 22 is a plan view of the multiple-voting lever and its connections.

For voting for the individual names I provide as follows: The plate G is provided with a series of slots or square openings $a'$, one for each candidate, and immediately under the plate G are a series of blocks K, one for each candidate, provided with upturned flanges $b'$ $b'$, which extend upward through the openings $a'$. For the purpose of voting an irregular ticket I cut openings $c'$ in the plate H at the proper places and hinge at the upper left-hand corner of each of these openings covers or shingles M, provided with handles $q$, so that the covers may be swung down, as will be hereinafter described. The inner edge of these covers is provided with a tongue $d'$, and the length of the blocks K is such that between the abutment of the left-hand flange $b'$ and the plate G on one side and the tongue $d'$ on the covers M on the other side is just sufficient to allow the entrance of a ball through any one of the openings in the same horizontal line. The voter who desires to vote for any candidate on any of the regular tickets, where there is only one person to be elected for any office, places his ball on the square opening immediately to the left of the name, just as in the Australian system he places a cross-mark opposite the name he proposes to vote for, the ball being placed between the lips of the blocks in each case. The ball when thus placed, crowding over the blocks, so that any other candidate on that line cannot be voted for, rests between the lips of the blocks on top of a plate L. This is the main sliding plate of the machine and is connected by the arm $o$ to the bar F. As heretofore described, as the voter entered the booth this plate was shifted by the movement of the bar to the left to occupy a position shown in Fig. 7. This plate L rests on top of the partitions of the cells heretofore spoken of and extends over the entire top of the machine. Square openings $e'$ are cut in the plate L and the metal bent downward to form tongues $f'$, and when the plate L is shifted over by the voter leaving the booth the openings $e'$ are brought in register with the openings $a'$ in the plate G, so that the ball N will drop through the two openings. Immediately underneath these openings, one for each cell, are pockets P, but with the left-hand side of the pocket open and the bottom of the pocket slightly inclined. The tongues $f'$ close up this open side just at the time the ball falls into the pocket, and the sliding plate L continues its movement under the impetus of the door and carries the pocket to the right, as shown in Fig. 8. These pockets are mounted on arms $g'$, strung on a pivot-bolt attached to plate R, one for each cell, and which plate is slid into place in grooves in the side walls of the cells, as shown in Fig. 10. Mounted on these plates R, one for each cell, are a series of register-wheels S, the units-wheel being mounted on the pivot-bolt and the tens and hundreds wheels on suitable studs and the series forming a set of total-adding wheels such as I have heretofore shown and described in another application now pending, and as any suitable register-wheels can be used in this connection no further description need be made except to say that the arms $g'$ carry pawls $h'$, which engage teeth $i'$ on the units-register wheel, so that each movement of the arm $g'$ will move the units-register wheel one point. The arms $g'$ also carry pivoted thereto horizontally-disposed rods $k'$, provided with suitable type or marking device $l'$ at its outer end. Journaled horizontally and from top to bottom of the machine at the right-hand side and immediately under the shingle openings $c'$ in the plate H is a roll of paper T. A type-ribbon $l''$ is disposed horizontally between the ends of the type-bars and the roll of paper. Thus for every ball deposited between the lips of the sliding blocks we will obtain a register thereof on the register-wheels and also there will be imprinted on the paper roll T a number corresponding to that in the cell of the candidate, so that we have two methods of checking and registering the vote. This roll of paper thus carrying an imprint of the vote may be preserved and serve as evidence in case of contest of the vote. It will be noticed that the roll of paper T is also directly under the openings in the plate H and in the sliding plate L, and now the purpose of the covers or shingles M and these openings will be manifest. If the voter does not wish to vote for any of the regular candidates, but to vote by writing names of his own selection, he pulls down the covers bearing the name of the office and writes upon the roll the name of his candidate.

Figures 23, 24, 25, 26:
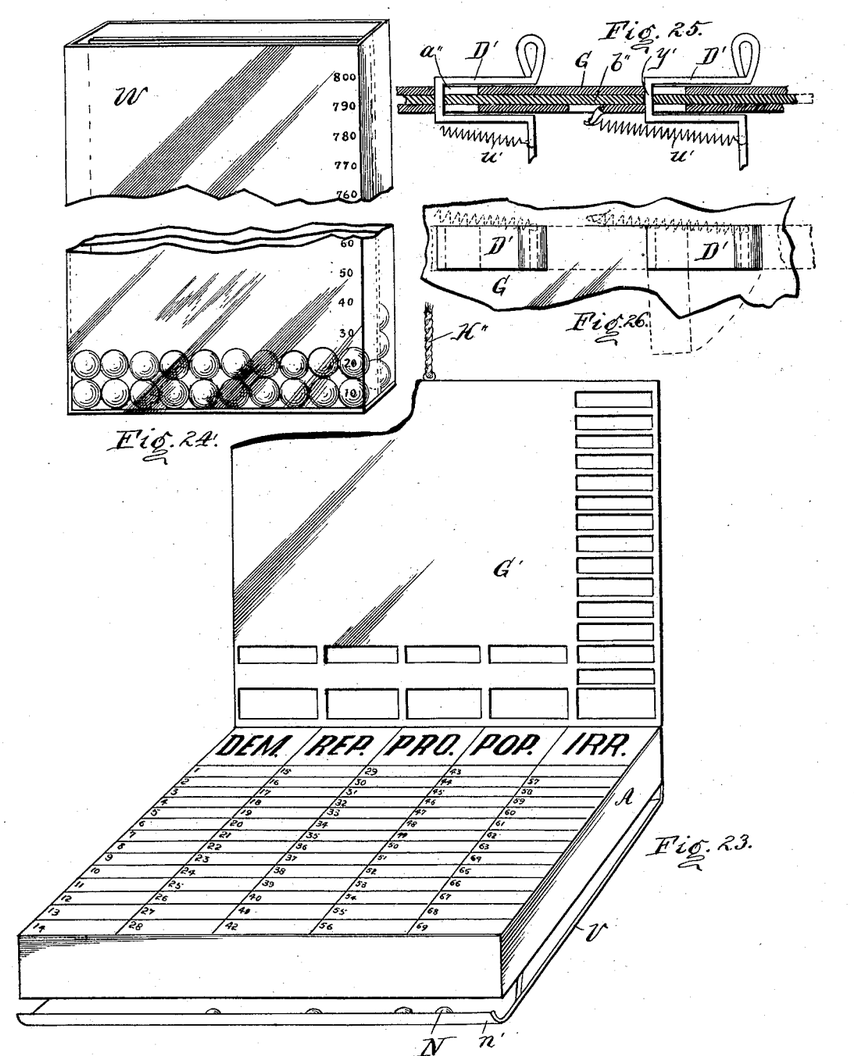
Fig. 23 is a perspective of my machine, showing an extra cover for use when certain of the voters are only entitled to vote for a portion of the ticket.
Fig. 24 is a perspective view of a modified form in which cells are provided to retain the voting-balls.
Figs. 25 and 26 are detail sectional and top plan views of two of the multiple-voting handles.

When the sliding plate L is returned to its normal position by movement of the door, as above described, the weighted arm U, rigidly fastened to the arm $g'$, draws back the type-bars and pockets that have been shifted to their normal position, the weighted arm resting on the pin $m'$, and thus the ball is released and drops out of the pocket down through the bottom of the cell onto the inclined shelf V, where it rolls down to the front ledge $n'$ to be used again. If it is desired to provide still another check on the voting, instead of having the inclined shelf V, I provide a series of receptacles or retaining-cells W, as shown in Fig. 24, arranged in the proper series and placed directly under the bottomless cells. Where a large number of votes are to be cast, it probably would not be practical to use these retaining-cells, as one ball has to be used for every vote cast; but in small elections these retaining-cells may serve as a very valuable check on the other operations of the register. To enable the judges to readily count the number of balls where the retaining-cells are used, I have divided them into sections and provide a cell to hold in one row just ten balls, so that at a glance the number of balls deposited may be ascertained.

For registering the operation of voting for a straight ticket by pulling down the levers I, I use slightly-different mechanism, as I do not employ the balls for voting straight tickets. Underneath the sliding plate L, under the head of the ticket-section, is a horizontal partition $A'$. Under each ticket in this partition $A'$ is cut an irregular opening $B'$. Mounted on the bottom of this partition are a series of register-wheels $C'$ of the same kind as are used for the registration of the movements of the door, as shown in Fig. 3, one tooth $p'$ of the units-register wheel extending out over the irregular opening $B'$. On the upper surface of the partition $A'$ are held by the clips $r'$ the type-bars $s'$—one for each ticket—and carrying at its outer end a tooth $t'$, corresponding to the tooth $p'$ on the units-register wheel, so that we have extending into this irregular opening above and below the partition one tooth of the register-wheel and the end of the type-bar. The arm $v$, which is actuated by the movement of the lever I, as above described, when the handle $w$ is brought down, extends down through the irregular opening $B'$ in the partition $A'$, and as the lever is actuated the end of this arm is carried from the upper side of this irregular opening to the lower side and is held against either edge of the irregular opening by the coiled spring $u'$, attached to the end of the arm and the sliding plate L. Now as the sliding plate is actuated by the movement of the door the arm $v$ is carried against the tooth of the units-register wheel $C'$ and the end of the type-bar $t'$, thus registering the operation and causing an imprint, as before, on the roll T, while at the end of the operation the spring $v'$ returns the type-bar to its normal position.

As the sliding plate L is advanced by the movement of the door the end of the arm $v$ is brought against the curved surface $w'$ of the irregular opening $B'$ and the arm is swung around until the spring $u'$ passes the pivotal center of the arm $v$, when it is at once snapped back to its normal position, thus returning the lever I to its voting position. It frequently happens, however, that more than one person is to be elected for a particular office, such as members of boards of various kinds where there are two or three or more to be elected, and provision must be made to allow the voter to select any of the names on the ballot. This, I understand, is called "multiple" voting. To provide for this multiple voting, I arrange the names of candidates in a horizontal line at the foot of the ticket, all the names for the particular office in one line, and I use levers $D'$, provided with a flat shank $y'$, which passes down through the long slot $a''$ in the top plate G, between the end edges of blocks $b''$, corresponding to the blocks K, but without any flanges, and through the slots $c''$ in the sliding plate L. The blocks $b''$ are of such length as to allow two of these levers $D'$ to be brought down where there are two candidates to be elected for the same office, and when there are more candidates than two blocks of suitable size are inserted to allow for the proper number of levers to be brought down. In other respects these flat shank-levers actuate the register-wheels in the same way as at the head of the ticket. In order, however, that when a straight ticket is voted and the plate H shifts the various blocks to prevent voting for individual candidates, this movement may also block out and prevent any multiple voting. It is necessary that the stop which is to lock the multiple-voting levers should move through twice the space for two candidates and three times the space for three candidates, and so on. I therefore provide the sliding stop E' at the end of the blocks $b''$ and engage this block E' by the connecting-bar F', which is pivoted at its upper end at $d''$ to the sliding plate L and by means of a pivot bolt or pin pivoted at its center to the sliding plate H. It will be evident from this construction that when a straight ticket is voted, as above described, and the plate H shifted to the left one space the outer end of the connecting-bar F' will be shifted two spaces, thus closing the two spaces in the multiple-voting line. So if there are three spaces to be blocked the bolt pivots the bar to the plate H one-third of its length from its pivotal point $d''$ to the sliding plate L, and so on for any distance that it is desired to throw over the stop-block E'.

It sometimes happens that certain of the electors at an election are permitted to vote only for certain candidates. For example, in many of the States women are entitled to vote only for members of school-board. In order to provide for such a contingency, I arrange a cover G', which is arranged to be hinged to the case A, at the upper end, and the cover is ordinarily held open and out of the way by a cord H' under the control of the judges of election. This cover is provided with a series of openings to expose only the candidates for which the special electors are permitted to vote, so that when said elector enters the booth the judges drop the cover, which prevents such elector from voting for any candidate except those permitted, as will be readily understood.

The operation of the machine will be sufficiently evident, I think, from the foregoing description. The voter enters the booth and takes the voting-machine with him. He then finds before him a complete list of the candidates precisely as in the Australian ballot system. If he desires to vote a straight ticket, he pulls down the handle at the head of the ticket. This shifts the plate H, brings the pins therein under the other voting-handles for straight tickets, and blocks up all the other spaces on the ticket by drawing over the side arm of the plate H against all of the blocks which are arranged in horizontal rows. If he desires to vote for individual names on the various tickets, he places balls, which he will find in the proper rack, between the flanges of the blocks opposite each name he wishes to vote for. Should he not desire to vote for any of the candidates on the tickets, he draws down the covers under the head of the irregular ticket and writes the name of his candidate on the roll of paper. After doing any of these things it will be evident from the foregoing description that no vote has yet been registered and he can of course either draw back the straight-ticket handle or change the position of the balls or scratch out the name of the irregular candidate he may have written. When the straight-ticket handles are returned to their normal position, the spring $e''$, attached to the plate L and to the plate H, draws back this plate H to its normal position, removing the pins, so that any other handle can be brought down. In other words, there is no voting until the voter leaves the booth. He has full and absolute control over the selection of candidates until he is ready to leave the booth. As the voter leaves the booth, however, the movement of the door shifts over to the right the sliding plate L, and it is by the movement of this plate that all of the registration is accomplished. For the head of the ticket the voting-levers are carried over against the register-wheels, and the top bars for the individual names and balls are deposited in the pockets to receive them, and the pockets carried over by the plate to register the vote on the register-wheels and on the roll of paper and for the multiple voting the flat shank-levers are carried and register as in the case of the head of the ticket.

Having thus described my invention, what I claim, and desire to secure by Letters Patent, is—

1. In a voting-machine, the combination, with a swinging door, and a case mounted thereon, with registering apparatus in said case, of means for actuating the registry apparatus, and connecting mechanism intermediate the frame and actuating device whereby the movement of the door will effect the registration.

2. In a voting-machine, the combination, with a swinging door, and a case mounted thereon, with registering apparatus in said case, of means for actuating the registry apparatus, with bar connected therewith pivoted to the door at one end and secured to the door-frame at the other eccentrically of the door-pivot whereby the movement of the door will shift said bar to actuate the registering mechanism.

3. In a voting-machine, a door for closing the booth, pivotally mounted at its middle line in the door-frame, a plurality of adding-wheels mounted in the door and an undulating track upon which said door rides, with pawl on the door-frame to contact with said adding-wheels when the door is raised by said track as the door is rotated, substantially as described.

4. In a voting-machine, a plurality of pivoted levers, a sliding plate upon which said levers are mounted, a plurality of fixed registering devices, one for each lever, with arms on said levers set to engage said registry devices by the movement thereof, and means for sliding said plate to actuate the registry devices, substantially as shown and described.

5. In a voting-machine, the combination, with a swinging door and a case for the voting apparatus mounted thereon of a plurality of pivoted levers in the case sliding plate upon which said levers are mounted, a plurality of fixed registry devices, one for each lever, with arms on said levers set to engage said registry devices by the movement thereof, and connecting mechanism intermediate the frame and sliding plate whereby the movement of the door in the frame will actuate said plate to effect the registration, substantially as described.

6. In a voting-machine, a plurality of pivoted levers, a sliding plate upon which said levers are mounted, a plurality of fixed registering devices, one for each lever, with arms on said levers set to engage said registry devices by the movement thereof, and a supplemental sliding plate, engaged by said levers and carrying stops to block the pathway of the levers and to permit the movement of only one at a time, substantially as described.

7. In a voting-machine, a plurality of pivoted levers, a sliding plate upon which said levers are mounted, a plurality of fixed registry devices and sliding type-bars, one for each lever with arms on said levers set to engage said registry devices and type-bars simultaneously by the movement of the levers with roll of paper to receive the impression from the type-bars and means for sliding said plate to actuate the registry devices and type-bars, substantially as shown and described.

8. In a voting-machine, a plurality of pivoted levers, a sliding plate upon which said levers are mounted, a plurality of fixed registry devices, one for each lever, with arms on said levers set to engage said registry devices by the movement of said levers, cam-surfaces interposed in the pathway of said arms with springs to keep said arms in contact therewith, and means for sliding said plate to actuate the registry devices and bring said arms into engagement with said cam-surfaces to return same and the pivoted levers to their normal position, substantially as described.

9. In a voting-machine, a plurality of pivoted levers, a sliding plate upon which said levers are mounted, fixed partition underneath said sliding plate provided with a plurality of irregular openings, a plurality of registry devices one for each lever secured to said plate with one tooth of each registry device extending into its corresponding irregular opening, arms on the pivoted levers each extending through its corresponding irregular openings and held on either side edge thereof by springs and means for sliding said plate to actuate the registry devices and return said arms and levers to their normal position, substantially as described.

10. In a voting-machine a series of cells one for each candidate, a sliding plate provided with a series of openings for the passage of ballot-balls, a series of brackets to receive the balls one for each cell mounted on arms, registry devices actuated by the movement of said arms, said brackets being open at one side with flanges on the sliding plate to close said open side and means for sliding said plate to actuate the registry device and weight for returning said brackets to normal position to release said balls, substantially as described.

11. In a voting-machine, a plurality of pivoted levers for straight-ticket voting, a series of registry devices for each individual candidate and a set of interfering blocks in each horizontal row to permit the registration of but one selection at a time in any one row, and an L-shaped plate actuated by the straight-ticket levers to contact with said blocks and prevent any voting for individual candidates when a straight ticket is voted, substantially as described.

12. In a voting-machine, a plurality of pivoted levers for straight-ticket voting and a series of registry devices for each individual candidate and a set of interfering blocks in each horizontal row to permit the registration of such plurality of candidates as may be desired, and an L-shaped plate actuated by the straight-ticket levers, a supplemental block in line with said interfering blocks and a connecting-lever to fulcrum same at various points on said L-shaped plate whereby the movement of the plate will shift the supplemental block the proper distance to close the row against further voting, substantially as described.

13. In a voting-machine, a plurality of pivoted levers, provided with flat shanks, a series of interfering blocks mounted between said flat shanks, with space to rotate one of said levers at a time, but to block the movement of the balance of said series, substantially as shown and described.

14. In a voting-machine, the combination, with a plurality of pivoted levers and a series of voting devices for individual candidates, of an L-shaped plate in connection with said levers and shifted by the movement thereof, with connecting mechanism between the side extension of said plate and the individual-voting devices, whereby when any of said levers are operated said individual-voting devices will be locked from use, substantially as described.

FRANK M. BORING.

Witnesses:
CLARENCE E. MEHLHOPE,
H. G. EDWARDS.